Dec. 13, 1949  F. W. TAYLOR  2,491,229
ANTIOSCILLATION MOUNT
Filed March 2, 1945  2 Sheets-Sheet 1

Inventor
Frank W. Taylor
by Roberts, Cushman & Grover
att'ys.

Dec. 13, 1949   F. W. TAYLOR   2,491,229
ANTIOSCILLATION MOUNT
Filed March 2, 1945   2 Sheets-Sheet 2

Inventor
Frank W. Taylor
by Roberts, Cushman & Grover
att'ys

Patented Dec. 13, 1949

2,491,229

UNITED STATES PATENT OFFICE 2,491,229

ANTIOSCILLATION MOUNT

Frank W. Taylor, Los Angeles, Calif., assignor to Technicolor Motion Picture Corporation, Hollywood, Calif., a corporation of Maine Application March 2, 1945, Serial No. 580,521

13 Claims. (Cl. 248—358)

This invention relates to anti-oscillation mounts for optical instruments and other objects, the purpose being to provide a mount which is capable of isolating the instrument from rotational vibration about all three axes, vertical, horizontal and transverse, which avoids the excessive number of bearings and damping devices heretofore used in such mounts, which is simple and economical in construction, which is light and compact, and which is efficient and durable in use.

According to this invention the mount comprises inner and outer parts interconnected for limited oscillatory movement relatively to each other, together with a mass of soft resilient yet form-retaining material, such as rubber, interposed between the two parts for holding them in predetermined spaced relationship while permitting said oscillatory movement, inner and outer supports fast to the aforesaid inner and outer parts respectively, one for supporting the mount and the other for supporting an optical instrument or the like on the mount, the outer part having an opening to accommodate the inner support with sufficient clearance to permit said oscillatory movement. Preferably the mount also comprises means fast to one of the aforesaid parts for frictional engagement with the other part for damping the oscillatory movement. In the preferred embodiment the inner part comprises a ball and the outer part comprises two cup-shaped shells which are preferably substantially hemispherical and which extend around opposite sides of the ball with peripheral flanges facing each other, together with means for securing the flanges together and to said outer support. The inner support may also have a skirt extending into juxtaposition to the aforesaid flanges for limiting the extent of the oscillatory movement. In the preferred embodiment the aforesaid damping means comprises a disk spring disposed around the inner support with radial fingers flexed toward the center of the aforesaid ball by the outer shell for frictionally damping the oscillatory movement. The spring fingers may be separated from the outer shell by means of a lining of felt or other suitable material and some of the aforesaid resilient rubbery material may be disposed between the fingers and the inner ball.

For the purpose of illustration typical embodiments are shown in the accompanying drawings in which Fig. 1 is a front elevation of the preferred embodiment;

Figure 1:
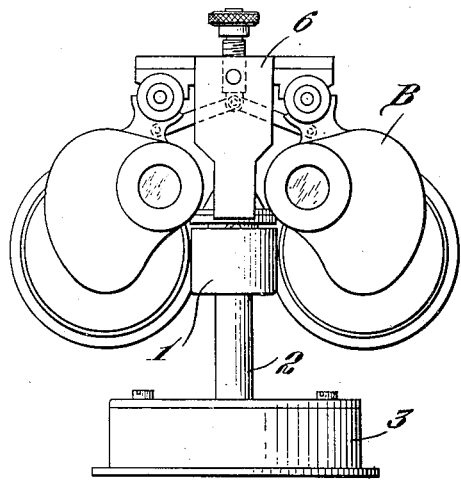
Figure 2:
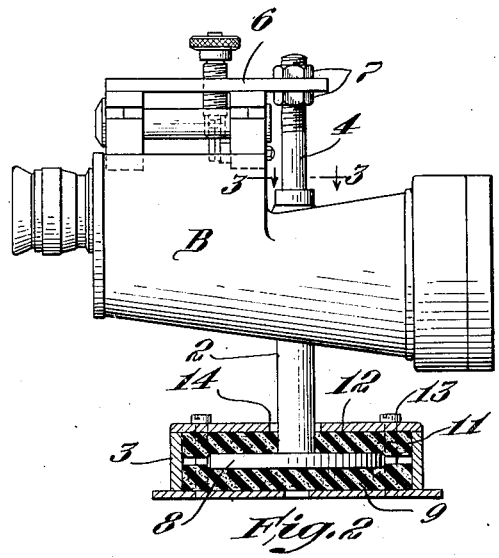
Fig. 2 is a side elevation of the same embodiment, the base being shown in section.

The particular embodiment of the invention shown in Figs. 1 to 5 inclusive comprises a housing 1, a support for the housing comprising a pedestal 2 and a base 3 and a support 4 extending upwardly from the mount. While any device may be mounted on the support 4, Figs. 1 and 2 show a pair of binoculars B secured to the upper end of the support by means of a bracket 6 and nuts 7. As shown in Fig. 2 the lower end of the support 2 comprises a circular plate 8. Below the plate 8 is a disk 9 and above the plate is a ring 11, both formed of sponge rubber. A cover 12 compresses the disk and ring against the plate 8, the cover being held in place by screws 13 and having an opening 14 somewhat larger than the support 2 to accommodate the latter.

Figure 3:
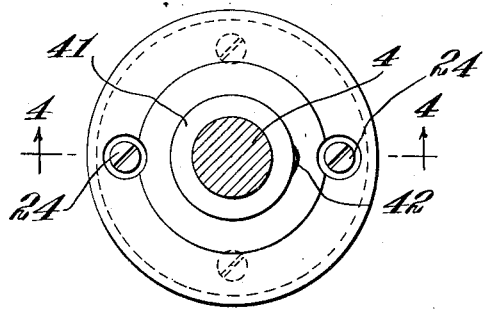
Fig. 3 is a section on line 3—3 of Fig. 2.
Figure 5:
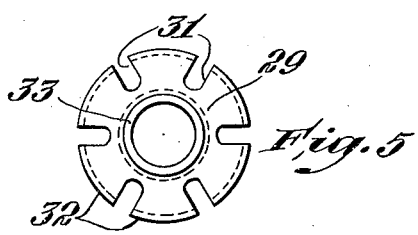
Fig. 5 is a plan view of the aforesaid friction spring.
Figure 4:
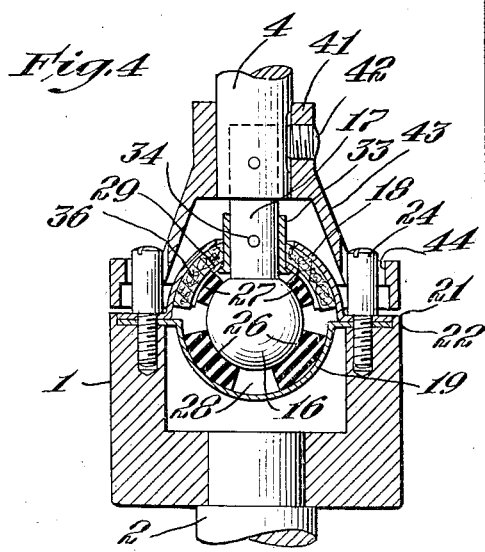
Fig. 4 is a section on line 4—4 of Fig. 3.

The mount, shown in detail in Figs. 3, 4 and 5, comprises an inner ball 16 provided with a shank 17 which telescopes into an opening in the lower end of the support 4. Surrounding the ball 16 in spaced relationship thereto is a spherical shell comprising upper and lower parts 18 and 19 having peripheral flanges 21 and 22 which abut together and are secured to the upper edge of the cup-shaped housing 1 by means of screws 24. Interposed between the ball 16 and the shell 18—19 are two rings 26 and 27 of soft rubber, the opening in the lower ring being indicated at 28 in Fig. 4.

Mounted on the shank 17 is a disk spring 29 having radial slots 31 to provide spring fingers 32 (Fig. 5), the spring seating on a collar 33 which surrounds the shank 17 and which is secured thereto by means of a pin 34. Interposed between the spring 29 and the upper part 18 of the outer shell is a layer 36 of felt or other material suitable for use as a brake lining to increase the friction on the shell. When the parts are assembled the fingers 32 are flexed downwardly to the position shown in Fig. 4 and their tendency to resume normal position presses the felt 36 against the inner periphery of the shell 18. The amount of frictional resistance may be adjusted by varying the position of the collar 33, the stiffness of the spring, the thickness of the lining 36, etc.

For the purpose of limiting the movement of the ball 16 relatively to the shell 18—19, the support 4 may be provided with a collar 41 secured thereto by a set screw 42 and provided with a depending skirt 43 which extends into juxtaposition to the upper flange 21. At the bottom the skirt has a radial flange provided with openings 44 to accommodate the screws 24, the openings 44 being somewhat larger than the heads of the screws to permit a predetermined amount of movement of the ball relative to the shell before the skirt 43 engages the screw. Clearance is also provided between the bottom of the skirt and the flange 21 for the same purpose. The two clearances may be equal or either clearance may be larger than the other.

When the mount is subjected to rotational vibration the rubber 26—27 gives sufficiently to permit relative oscillation between the ball 16 and the shell 18—19. Since there is no slippage between the rubber and the associated parts, the resiliency of the rubber returns the parts to normal position. Slippage between the felt 36 and shell 18 tends to dampen the vibrational movement, the spring 29 pressing the felt tightly against the outer shell. Thus rotational vibration in any plane is absorbed by the mount.

Figure 6:
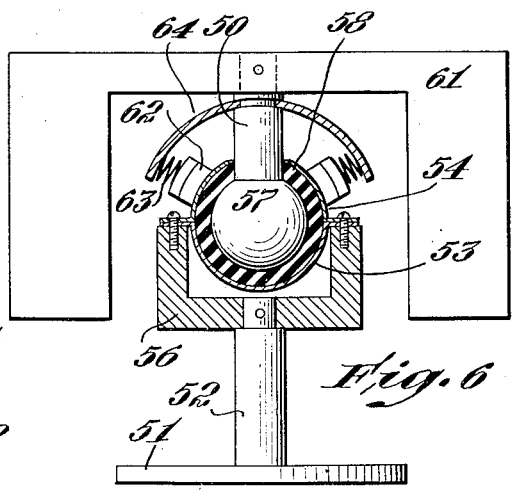
Fig. 6 is a vertical central sectional view of a modification.
Figure 7:
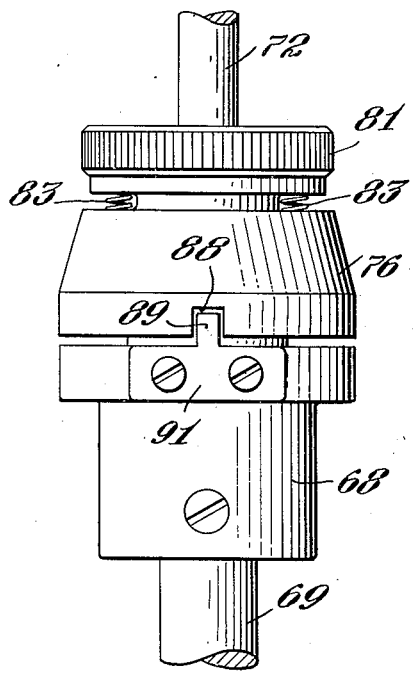
Fig. 7 is a side view of another modification.

The modification shown in Fig. 6 is like the first embodiment in that it comprises a base 51, a support 52 for the housing 56, two hemispherical shells 53 and 54 having peripheral flanges secured to the edge of the housing, a ball 57 inside the shell, rubber 58 between the ball and the shell, a support 50 extending fom the ball 57 upwardly through an opening in the shell 54 to support any suitable object such as indicated at 61. This mount absorbs rotational vibrations as above described but the means for damping the vibrations are somewhat different. Instead of having a spring ring such as 29 between the ball and the shell, the support 50 carries two or more brake shoes 62 which are pressed against the outer periphery of the shell 54 by means of compression springs 63 interposed between the shoes and the supporting arms 64. As the ball 37 oscillates relatively to the shell 53—54, the shoes 62 slide over the outer periphery of the shell 54, thereby damping the vibrations. If desired the arms 64 may carrying cylindrical guides fitting around the shoes 62 and the springs may be adjustable to vary the frictional resistance.

The embodiment of the invention shown in Figs. 7 to 13 inclusive is similar to the other embodiments in that it comprises an inner part in the form of a ball 64, an outer part comprising two spherical shells 66 and 67 having abutting flanges mounted on a cup-shaped support 68 which in turn is mounted on a post 69, rubber members 71 between the inner and outer parts and a post 72 extending upwardly from the ball 64 through an opening in the shell 66. The ball 64 also has a depending pin 72 which projects through an opening in the lower shell 67. By making the clearance between the pin 72 and the surrounding edge of the shell 67 approximately equal to the corresponding clearance between the post 72 and the surrounding edge of the shell 64 there is no tendency to throw the ball 64 off center when the post 72 strikes the edge of the opening in shell 66 because the pin 73 strikes the edge of its opening at the same time. By knurling the ball 64 it may be gripped by the rubber members 71 without slippage.

Mounted on the post 72 is a collar 74 having a depending skirt 76, the collar being held on the post by means of a set screw 77. Fitting in the opening within the skirt 76 is an annular brake shoe 78 having a brake lining 79 of felt or the like engaging the outer periphery of the spherical shell 66, the operative surface of the brake also being spherical. Threaded on the upper end of the collar is a ring 81 beneath which is another ring 82 having three spring recesses spaced 120° apart around the ring. The brake shoe 78 has corresponding recesses and extending between the two sets of recesses through openings 85 in the collar 74 are compression springs 83 for yieldingly urging the brake against the outer periphery of the shell 66. The brake pressure may be varied by threading the ring 81 up and down. Disposed between the collar 74 and the brake 78 are three leaf springs 84. Corresponding ends of the springs are secured to the lower face of the collar 74 by means of screws 86 and the opposite ends of the springs are secured to the brake 78 by means of screws 87. Thus the brake 78 is prevented from rotating circumferentially while being free to move up and down. On one side the skirt 76 has a recess 88 to receive a lug 89 fast to a plate 91 on the lower support 68.

Figure 8:
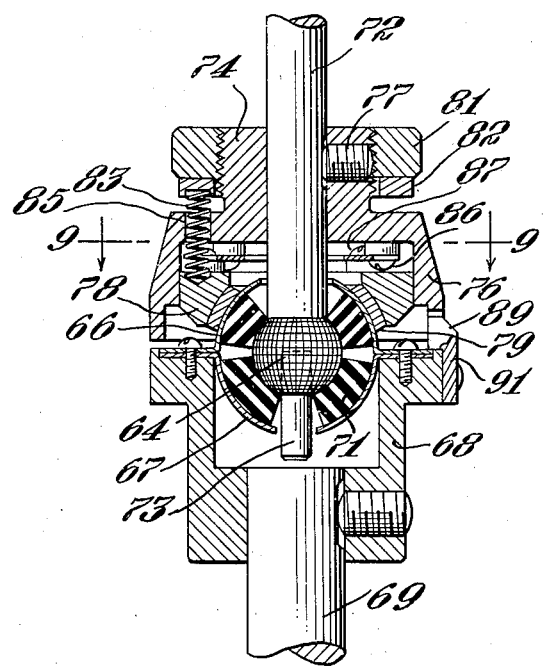
Fig. 8 is a central longitudinal section of the latter modification.
Figure 10:
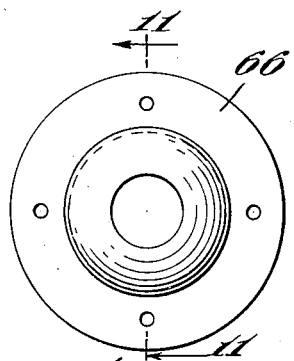
Fig. 10 is a plan view of one of the cup-shaped shells.
Figure 11:
Fig. 11 is a section through the shell on line 11—11 of Fig. 10.
Figure 9:
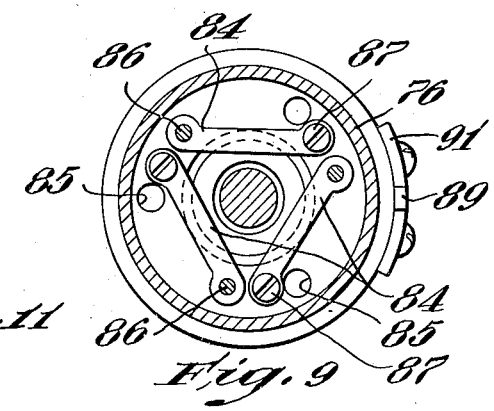
Fig. 9 is a section on line 9—9 of Fig. 8.
Figure 12:
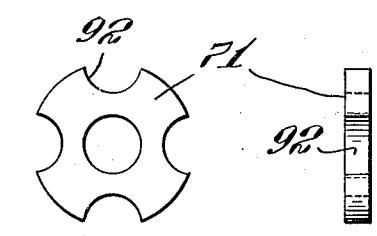
Fig. 12 is a plan view of one of the rubber members between the inner and outer parts.
Figure 13:
Fig. 13 is an edge view of the rubber member.

As shown in Figs. 12 and 13 the rubber members 71 have axial openings to receive the post 72 and pin 73 respectively and they also have recesses 92 in their peripheries to facilitate flexing them into the position shown in Fig. 8. The recesses also reduce the restoring force of the rubber and by regulating the size of the recesses the frequency of oscillation may be controlled. Instead of using separate rubber members a layer of rubber may be vulcanized on the ball 64, in which case the frequency of oscillation may be regulated by grooving the outer periphery of the layer of rubber. The characteristics of the device may be regulated by adjusting the thickness of the rubber layer. If the layer is too thick the object supported on the post 72 tends to bounce up and down. If the layer is too thin the restoring force is too great and vibrations are transmitted through the device too freely.

For supporting binoculars of the usual weight the thickness should be about one-eighth inch. While various kinds of rubber may be used pure gum rubber is preferable because it has less internal friction and less restoring force so that it transmits vibrations less freely. By having substantially no damping effect in the rubber and substantially no restoring force in the felt lining of the brake, each factor may be regulated substantially independently of the other.

The rubber connection between the relatively movable parts is preferable to Gimbel rings because rubber has less starting friction. By using a synthetic rubber its resilience may be maintained substantially constant throughout wide temperature changes. Moreover the rubber construction involves fewer parts and simpler construction than the old Gimbel type.

From the foregoing it will be evident that the damping effect of the brake may be adjusted by threading the ring 81 up and down. This adjustment may also be used to compensate for wear on the parts and variations due to atmospheric conditions. To reduce the transmission of vibrations through the device the brake pressure is reduced and to increase the damping effect the pressure is increased.

In each embodiment the rate of decay, the damping ratio, the damping time, etc., can be varied to suit any particular condition by proper selection or adjustment of the braking force. When the impressed force is a constant high frequency low aptitude force, the natural frequency of the device should be at least one-fifth of the impressed frequency, in which case the vibrations are almost completely absorbed by the rubber surrounding the inner ball so that very little oscillation is transmitted through the mount.

Thus no damping would be necessary if only a constant high frequency force were present, but since there are usually transient forces acting on the device the damping means should ordinarily be included.

It should be understood that the present disclosure is for the purpose of illustration only and that this invention includes all modifications and equivalents which fall within the scope of the appended claims.

I claim:

1. An anti-oscillation mount comprising inner and outer parts interconnected for limited oscillatory movement relatively to each other, a mass of soft resilient yet form-retaining material interposed between said two parts for holding the parts in predetermined spaced relationship while permitting said oscillatory movement, inner and outer supports fast to said inner and outer parts respectively, one for supporting the mount and the other for supporting an object on the mount, the outer part having an opening to accommodate the inner support with sufficient clearance to permit said oscillatory movement, said inner part comprising a ball and said outer part comprising two cup-shaped shells extending around opposite sides of the ball with peripheral flanges facing each other, means for securing said flanges together and to said outer support, and a skirt on the inner support extending toward said flanges, the edge of the skirt being close enough to said flanges to limit said oscillatory movement.

2. An anti-oscillation mount comprising inner and outer parts interconnected for limited oscillatory movement relatively to each other, a mass of soft resilient yet form-retaining material interposed between said two parts for holding the parts in predetermined spaced relationship while permitting said oscillatory movement, means fast to one of said parts for frictional engagement with the other part for damping said oscillatory movement, inner and outer supports fast to said inner and outer parts respectively, one for supporting the mount and the other for supporting an object on the mount, the outer part having an opening to accommodate the inner support with sufficient clearance to permit said oscillatory movement, said inner part comprising a ball and said outer part comprising two cup-shaped shells extending around opposite sides of the ball with peripheral flanges facing each other, means for securing said flanges together and to said outer support, and a skirt on the inner support extending toward said flanges, the edge of the skirt being close enough to said flanges to limit said oscillatory movement.

3. An anti-oscillation mount comprising inner and outer parts interconnected for limited oscillatory movement relatively to each other, a mass of soft resilient yet form-retaining material interposed between said two parts for holding the parts in predetermined spaced relationship while permitting said oscillatory movement, inner and outer supports fast to said inner and outer parts respectively, one for supporting the mount and the other for supporting an object on the mount, the outer part having an opening to accommodate the inner support with sufficient clearance to permit said oscillatory movement, said inner part comprising a ball and said outer part comprising two cup-shaped shells extending around opposite sides of the ball with peripheral flanges facing each other, means for securing said flanges together and to said outer support, and a disk spring disposed around the inner support with radial fingers flexed inwardly toward said ball by the outer part for frictionally damping said oscillatory movement.

4. An anti-oscillation mount comprising inner and outer parts interconnected for limited oscillatory movement relatively to each other, a mass of soft resilient yet form-retaining material interposed between said two parts for holding the parts in predetermined spaced relationship while permitting said oscillatory movement, inner and outer supports fast to said inner and outer parts respectively, one for supporting the mount and the other for supporting an object on the mount, the outer part having an opening to accommodate the inner support with sufficient clearance to permit said oscillatory movement, said inner part comprising a ball and said outer part comprising two cup-shaped shells extending around opposite sides of the ball with peripheral flanges facing each other, means for securing said flanges together and to said outer support, a disk spring disposed around the inner support with radial fingers flexed inwardly toward said ball by the outer part for frictionally damping said oscillatory movement, and a lining between said fingers and outer part.

5. An anti-oscillation mount comprising inner and outer parts interconnected for limited oscillatory movement relatively to each other, a mass of soft resilient yet form-retaining material interposed between said two parts for holding the parts in predetermined spaced relationship while permitting said oscillatory movement, inner and outer supports fast to said inner and outer parts respectively, one for supporting the mount and the other for supporting an object on the mount, the outer part having an opening to accommodate the inner support with sufficient clearance to permit said oscillatory movement, said inner part comprising a ball and said outer part comprising two cup-shaped shells extending around opposite sides of the ball with peripheral flanges facing each other, means for securing said flanges together and to said outer support, a disk spring disposed around the inner support with radial fingers flexed inwardly toward said ball by the outer part for frictionally damping said oscillatory movement, a lining between said fingers and outer part, and some of said resilient material being disposed between the fingers and the inner part.

6. An anti-oscillation mount comprising inner and outer parts interconnected for limited oscillatory movement relatively to each other about a center of oscillation, a mass of soft resilient yet form-retaining material interposed between said two parts for holding the parts in predetermined spaced relationship while permitting said oscillatory movement, inner and outer supports fast to said inner and outer parts respectively, one for supporting the mount and the other for supporting an object on the mount, the outer part having an opening to accommodate the inner support with sufficient clearance to permit said oscillatory movement, said outer part having an outer spherical surface approximately concentric with said center, and a brake mounted on said inner support outside said outer part, the brake having a spherical surface for frictional engagement with said surface to damp said oscillatory movement about said center of oscillation.

7. An anti-oscillation mount comprising inner and outer parts interconnected for limited oscillatory movement relatively to each other about a center of oscillation, said outer part having an outer spherical surface approximately concentric with said center, a mass of soft resilient yet form-retaining material interposed between said two parts for holding the parts in predetermined spaced relationship while permitting said oscillatory movement, a post extending outwardly from the inner part through an opening in the outer part, a collar mounted on said post outside the outer part, and an annular brake carried by the collar, the brake having a spherical surface for frictional engagement with said surface to damp said oscillatory movement about said center of oscillation.

8. An anti-oscillation mount comprising inner and outer parts interconnected for limited oscillatory movement relatively to each other about a center of oscillation, said outer part having an outer spherical surface approximately concentric with said center, a mass of soft resilient yet form-retaining material interposed between said two parts for holding the parts in predetermined spaced relationship while permitting said oscillatory movement, a post extending outwardly from the inner part through an opening in the outer part, a collar mounted on said post outside the outer part, an annular brake shoe carried by the collar, the brake having a spherical surface for frictional engagement with said surface to damp said oscillatory movement about said center of oscillation, and a spring interposed between the collar and shoe yieldingly to urge the shoe against said outer part.

9. An anti-oscillation mount comprising inner and outer parts interconnected for limited oscillatory movement relatively to each other about a center of oscillation, said outer part having an outer spherical surface approximately concentric with said center, a mass of soft resilient yet form-retaining material interposed between said two parts for holding the parts in predetermined spaced relationship while permitting said oscillatory movement, a post extending outwardly from the inner part through an opening in the outer part, a collar mounted on said post outside the outer part, an annular brake shoe carried by the collar, the brake having a spherical surface for frictional engagement with said surface to damp said oscillatory movement about said center of oscillation, a spring interposed between the collar and shoe yieldingly to urge the shoe against said outer part and means for adjusting the pressure of said spring.

10. An anti-oscillation mount comprising inner and outer parts interconnected for limited oscillatory movement relatively to each other about a center of oscillation, said outer part having an outer spherical surface approximately concentric with said center, a mass of soft resilient yet form-retaining material interposed between said two parts for holding the parts in predetermined spaced relationship while permitting said oscillatory movement, a post extending outwardly from the inner part through an opening in the outer part, a collar mounted on said post outside the outer part, an annular brake shoe carried by the collar, the brake having a spherical surface for frictional engagement with said surface to damp said oscillatory movement about said center of oscillation, a ring mounted on said collar and spring means interposed between said shoe and ring for pressing the shoe against said outer part, the ring being adjustably mounted to vary the pressure of the spring means.

11. An anti-oscillation mount comprising inner and outer parts interconnected for relative rotary movement about an axis extending through both parts and relative tipping movement laterally of said axis, a mass of soft resilient yet form-retaining material interposed between said two parts for holding the parts in predetermined spaced relationship while permitting said relative movements, means fast to one of said parts for frictional engagement with the other part for damping said relative tipping movement, inner and outer supports fast to said inner and outer parts respectively, one for supporting the mount and the other for supporting an object on the mount, the outer part having an opening to accommodate the inner support with sufficient clearance to permit said relative tipping movement, said inner part comprising a ball and said outer part comprising two cup-shaped shells extending around opposite sides of the ball with peripheral flanges facing each other and means for securing said flanges together and to said outer support.

12. An anti-oscillation mount compriing inner and outer parts interconnected for relative rotary movement about an axis extending through both parts and relative tipping movement laterally of said axis, a mass of soft resilient yet form-retaining material interposed between said two parts for holding the parts in predetermined spaced relationship while permitting said relative movements, means fast to one of said parts for frictional engagement with the other part for damping both said relative rotary movement and said relative tipping movement, inner and outer supports fast to said inner and outer parts respectively, one for supporting the mount and the other for supporting an object on the mount, the outer part having an opening to accommodate the inner support with sufficient clearance to permit said relative tipping movement, said inner part comprising a ball and said outer part comprising two cup-shaped shells extending around opposite sides of the ball with peripheral flanges facing each other and means for securing said flanges together and to said outer support.

13. An anti-oscillation mount comprising inner and outer parts inteconnected for relative rotary movement about an axis extending through both parts and relative tipping movement laterally of said axis, a mass of soft resilient yet form-retaining material interposed between said two parts for holding the parts in predetermined spaced relationship while permitting said relative movements, a damper fast to one of said parts for frictional engagement with the other part for damping both said relative rotary movement and said relative tipping movement, inner and outer supports fast to said inner and outer parts respectively, one for supporting the mount and the other for supporting an object on the mount, the outer part having an opening to accommodate the inner support with sufficient clearance to permit said relative tipping movement, said inner part comprising a ball and said outer part comprising two cup-shaped shells extending around opposite sides of the ball with peripheral flanges facing each other and means for securing said flanges together and to said outer support.

FRANK W. TAYLOR.

REFERENCES CITED

The following references are of record in the file of this patent:

UNITED STATES PATENTS

| Number | Name | Date |
|---|---|---|
| 1,387,288 | Menefee | Aug. 9, 1921 |
| 2,317,501 | Tyler | Apr. 27, 1943 |

FOREIGN PATENTS

| Number | Country | Date |
|---|---|---|
| 346,769 | Great Britain | Apr. 17, 1931 |